United States Patent
Kim et al.

(10) Patent No.: US 8,213,135 B2
(45) Date of Patent: Jul. 3, 2012

(54) POWER FACTOR CORRECTION CIRCUIT AND DRIVING METHOD THEREOF

(75) Inventors: Dong-Hee Kim, Bucheon (KR); Jung-Won Kim, Seoul (KR); Dae-Jung Kim, Incheon (KR)

(73) Assignee: Silicon Mitus, Inc., Haengdang-Dong, Seongdong-Gu, Seoul (KR)

( * ) Notice: Subject to any disclaimer, the term of this patent is extended or adjusted under 35 U.S.C. 154(b) by 267 days.

(21) Appl. No.: 12/610,519

(22) Filed: Nov. 2, 2009

(65) Prior Publication Data
US 2010/0110593 A1    May 6, 2010

(30) Foreign Application Priority Data
Nov. 3, 2008 (KR) .................. 10-2008-0108522

(51) Int. Cl.
*H02H 7/00* (2006.01)
(52) U.S. Cl. .......................... 361/18; 361/93.1
(58) Field of Classification Search .................. 323/272, 323/320, 222; 363/126, 21, 97, 89
See application file for complete search history.

(56) References Cited

U.S. PATENT DOCUMENTS

| | | | | |
|---|---|---|---|---|
| 5,856,917 A * | 1/1999 | Aonuma et al. | ........... | 363/21.04 |
| 6,043,633 A * | 3/2000 | Lev et al. | ........... | 323/222 |
| 6,222,746 B1 * | 4/2001 | Kim | ........... | 363/89 |
| 2003/0099119 A1 * | 5/2003 | Yamada et al. | ........... | 363/21.12 |
| 2004/0113594 A1 * | 6/2004 | Athari et al. | ........... | 323/222 |
| 2004/0178784 A1 * | 9/2004 | Okamoto | ........... | 323/283 |
| 2005/0219871 A1 * | 10/2005 | Li et al. | ........... | 363/21.1 |
| 2006/0061337 A1 * | 3/2006 | Kim et al. | ........... | 323/205 |
| 2009/0257257 A1 * | 10/2009 | Adragna et al. | ........... | 363/65 |
| 2010/0097041 A1 * | 4/2010 | Ayukawa et al. | ........... | 323/272 |
| 2011/0157940 A1 * | 6/2011 | Zhang | ........... | 363/126 |

FOREIGN PATENT DOCUMENTS

| | | |
|---|---|---|
| JP | 2003-189601 | 7/2003 |
| KR | 10-2004-0080910 | 9/2004 |
| KR | 10-2005-0084361 | 8/2005 |
| KR | 10-2006-0026701 | 3/2006 |
| WO | WO 2009025517 A2 * | 2/2009 |

* cited by examiner

*Primary Examiner* — Stephen W Jackson
*Assistant Examiner* — Angela Brooks
(74) *Attorney, Agent, or Firm* — Lexyoume IP Meister, PLLC.

(57) ABSTRACT

The present invention relates to a set protection circuit for when a diode short-circuit defect occurs in a power factor correction circuit of a critical conduction mode. In a conventional power factor correction circuit, an excessive amount of current flows to a switch if a diode is short-circuited so that the switch is damaged. In order to prevent damage to the switch, the present invention provides a method for stopping turn-on of the switch when a switch current is excessive.

14 Claims, 10 Drawing Sheets

POWER FACTOR CORRECTION CIRCUIT AND DRIVING METHOD THEREOF

CROSS-REFERENCE TO RELATED APPLICATION

This application claims priority to and the benefit of Korean Patent Application No. 10-2008-0108522 filed in the Korean Intellectual Property Office on Nov. 3, 2008, the entire contents of which are incorporated herein by reference.

BACKGROUND OF THE INVENTION (a) Field of the Invention

The present invention relates to a power factor correction circuit. More particularly, it relates to a power factor correction circuit for solving a problem of a diode short-circuit occurring in a conventional power factor correction circuit, and a driving method thereof.

(b) Description of the Related Art

A switching mode power supply (SMPS) in which a power factor correction circuit is not used generates a pulse-type input current to make a high-level harmonic current flow to an electricity transmission line. The pulse-type current increases a loss of a power transmission line and a transformer rather than contributing to power transmission. Thus capacities of transmission power lines, transformer substations, and power stations are increased compared to the SMPS using the power factor correction circuit.

In order to solve the problem, movements for regulating the current harmonic, such as EN61000-3-2, have recently occurred in many countries, and a lot of SMPSs use the power factor correction circuit for satisfying regulations. The SMPS is a device for converting an input supply voltage to at least one DC output voltage, and is used in most home appliances such as computers, monitors, and televisions (TV). The SMPS uses a power factor correction circuit for compensating a power factor by controlling an input current to follow an input voltage. That is, the power factor correction circuit controls an externally applied input current to follow an input voltage and simultaneously converts an input AC voltage to a constant DC voltage.

The power factor correction circuit uses a boost topology that includes an inductor, and has various modes according to a state of a current flowing through the inductor. In a discontinuous conduction mode, a zero point of the current flowing through the inductor exists so that the current discontinuously flows, and in a continuous conduction mode, the current zero point does not exist so that the current continuously flows. A critical conduction mode operates at the boundary of the continuous conduction mode and the discontinuous conduction mode, and the current flowing through the inductor is increased after the current flowing through the inductor becomes zero. The ST L6562 is the most well-known integrated circuit (IC) of the power factor correction circuit in the critical conduction mode, and FAN7527B, TDA4862, TDA4863, MC33260, MC33262, UC3852, and SG6561 are also ICs of the power factor correction circuit in the critical conduction mode.

FIG. 1 schematically shows a general power factor correction circuit of a critical conduction mode.

In the power factor correction circuit, switching of a switch S is determined according to a time that a current flowing to an inductor L becomes zero, and the current flowing to the inductor L can be detected by detecting a voltage of the inductor L. When a diode D is short-circuited due to a defect in the power factor correction circuit, an input voltage Vin is connected to an output capacitor C through the inductor L such that the input voltage Vin and an output voltage Vout of the power factor correction circuit become the same. Since the input voltage Vin and the output voltage Vout are the same, a lateral voltage of the inductor L becomes zero. When the lateral voltage of the inductor L is zero in the power factor correction circuit, a turn-on time of the switch S cannot be determined so that the switch S is designed to be compulsorily turned on, in general. When the switch S is compulsorily turned on while the diode D is in the short-circuit state, energy charged in the output capacitor C is discharged through the switch S so that an excessive amount of current instantly flows because no circuit for controlling the current exists between the switch S and the capacitor C.

FIG. 2 compares a voltage generated in a normal condition and a voltage generated by sensing the current flowing to the switch when the diode D is short-circuited. A voltage Vocp, which is an overcurrent reference voltage, compulsorily turns off the switch when a switch current sensing voltage Vcs is higher than the voltage Vocp.

The power factor correction circuit generates a signal for turning off the switch when the switching current sensing voltage Vcs and the overcurrent reference voltage Vocp become the same. However, a time delay occurs until the switch is substantially turned off due to circuits existing in the middle of transmission of the signal to the switch.

As shown in FIG. 2, a switch current increase, r1 due to the delay is small in the normal condition. However, when the diode D is short-circuited, the switch current is radically increased for a short time delay because the switch current has a steep slope so that a current increase r2 is very large. When the diode D is short-circuited, temperature of the switch is increased and switching operation is repeated due to the excessive current so that the switch may be damaged. That is, a set protection circuit is required when the diode D is short-circuited.

In addition, the power factor correction circuit may use another diode D2 to charge the output capacitor C so as to prevent noise generated from charging through the inductor L and the diode D at the starting stage or from inductor saturation.

FIG. 3 shows a power factor correction circuit including a separate diode. In this case, when a diode D1 is short-circuited, an input voltage Vin and an output voltage Vout become the same and therefore energy stored in an inductor L is not entirely discharged when the switch S is turned off. In addition, the switch S is turned on before a current of the diode D1 current becomes zero so that a reverse recovery current of the diode D1 flows through the switch S. In general, in the case of a power factor correction circuit of the critical conduction mode, the switch S is turned on after a current of a diode D1 becomes zero and the diode D1 is turned off, and therefore a diode having a long reverse recovery time is used. That is, since the reverse recovery current of the diode D1 flows for a long period of time, the temperature of the switch S is increased, thereby causing damage to the switch S.

A conventional method for preventing damage to a switch includes a method for additionally including a diode, as shown in FIG. 4. When diodes D1 and D2 are short-circuited, a current flow from an output of the power factor correction circuit to an input thereof can be prevented by using additional diodes D3 and D4. However, in this case, the additional diodes D3 and D4 cause a cost increase and a diode's forward voltage drop increases loss, thereby deteriorating efficiency.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a protection circuit of a power factor correction circuit for protecting a switch at a diode short-circuit.

A power factor compensation circuit according to an exemplary embodiment of the present invention includes an inductor including a first end to which an input voltage is input, a switch electrically connected to a second end of the inductor, and a diode transmitting a current flowing to the inductor to an output end. An occurrence of a current flowing to the switch that is higher than a predetermined threshold value is counted and the switch is turned off when the count is greater then a predetermined reference value. The power factor correction circuit further includes a diode short-circuit protection circuit that receives a detected voltage corresponding to the current flowing to the switch, compares a predetermined reference voltage corresponding to the threshold value with the detected voltage, counts an occurrence of the detected voltage being greater than the reference voltage, and turns off the switch when the count reaches the reference value. The diode short-circuit protection circuit includes a comparator including a non-inverting terminal to which the detected voltage is input and an inverting terminal to which the reference voltage is input and a counter counting an increase of an output signal of the comparator and outputting a protection signal for turning off the switch when the count is greater than the reference value. The power factor correction circuit further includes a secondary coil coupled to the inductor and to which a voltage corresponding to a lateral voltage of the inductor is induced. The counter resets the number of counts at a time that the voltage of the secondary coil is decreased lower than a predetermined threshold voltage after the switch is turned off. The switch is turned on by a gate signal activated for a period during which the voltage of the secondary coil is decreased to lower than the threshold voltage. The power factor correction circuit further includes a restarting timer generating a signal for turning on the switch with a predetermined cycle when no voltage is generated at the secondary coil. The diode short-circuit protection circuit further includes a cycle comparator that compares a cycle of the gate signal with a cycle of an output signal of the restarting timer and resets the counter when the cycle of the gate signal is shorter than that of the output signal of the restarting timer.

A driving method according to another exemplary embodiment of the present invention is provided to a power factor correction circuit including an inductor of which a first end is electrically connected to an input end of the power factor correction circuit, a secondary coil coupled to the inductor, a switch electrically connected to the inductor to control a current flowing thereto, and a diode transmitting the current flowing to the inductor to an output terminal of the power factor correction circuit. The driving method includes counting an occurrence of the current flowing to the switch that is greater than a predetermined threshold value and turning off the switch when the count is greater than a predetermined value. The driving method further includes resetting the count at a time that the voltage of the secondary coil is decreased to lower than a predetermined threshold voltage. In addition, the driving method further includes turning on the switch with a predetermined cycle when no voltage is generated at the secondary coil. The driving method further includes resetting the count when a turn-on cycle of the switch is shorter than the predetermined cycle.

According to the present invention, the switch can be protected at the diode short-circuit by detecting a short-circuit of the diode and controlling turn-off of the switch.

DETAILED DESCRIPTION OF THE EMBODIMENTS

Figure 1:
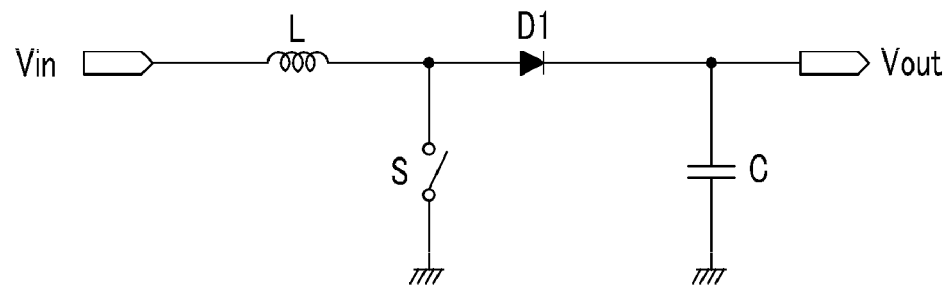
FIG. 1 schematically shows a power factor correction circuit in a general critical conduction mode.

In the following detailed description, only certain exemplary embodiments of the present invention have been shown and described, simply by way of illustration. As those skilled in the art would realize, the described embodiments may be modified in various different ways, all without departing from the spirit or scope of the present invention.

Accordingly, the drawings and description are to be regarded as illustrative in nature and not restrictive. Like reference numerals designate like elements throughout the specification.

Hereinafter, a power factor correction circuit and a diode short-circuit protection circuit thereof according to an exemplary embodiment of the present invention will be described in detail with reference to the drawings.

Figure 5:
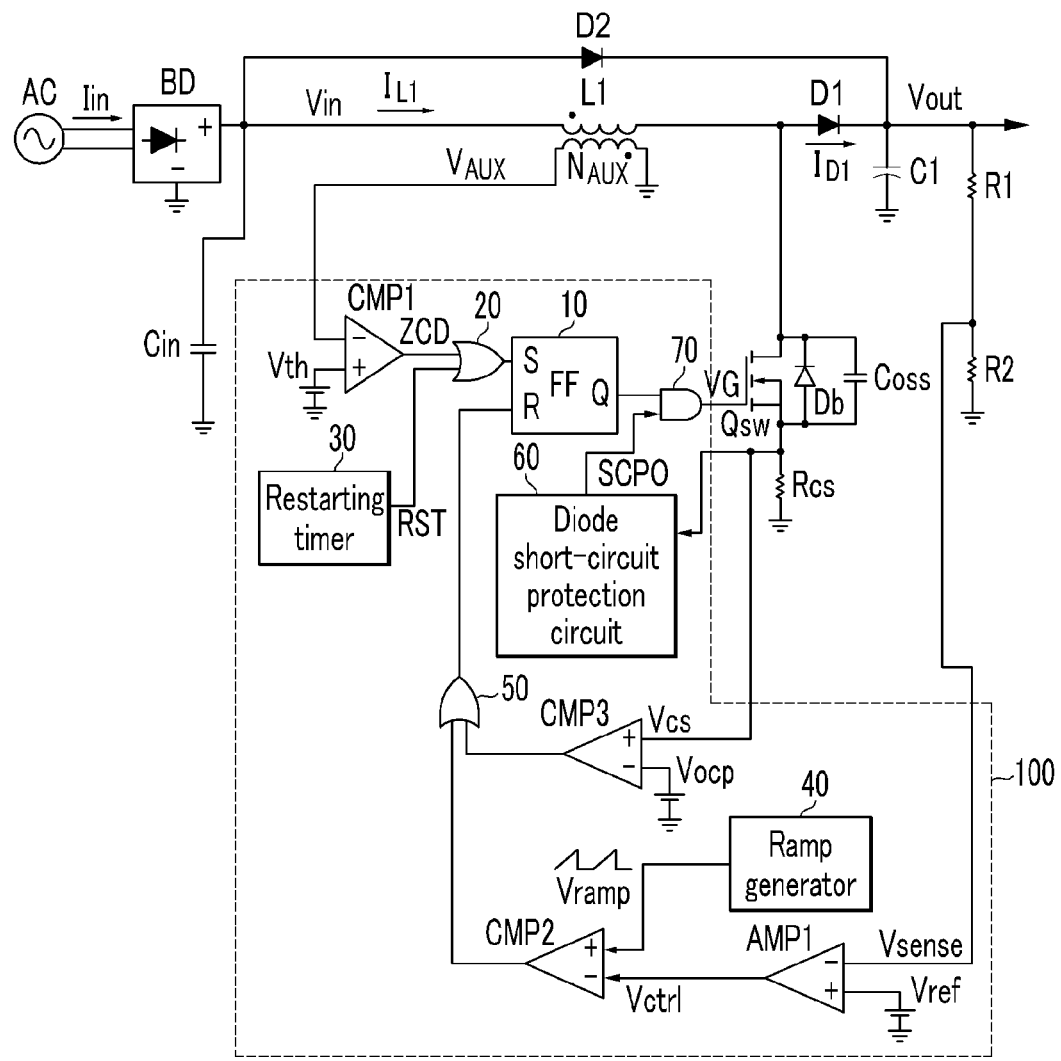
FIG. 5 shows a power factor correction circuit according to a first exemplary embodiment of the present invention.

FIG. 5 shows a power factor correction circuit according to a first exemplary embodiment of the present invention.

Referring to FIG. 5, a power factor correction circuit according to the first exemplary embodiment of the present invention includes a bridge diode BD, a boost circuit, and a switching controller 100. The boost circuit includes an inductor L1, a switch Qsw, diodes D1 and D2, and capacitors C1 and Cin. Hereinafter, for convenience of description, a configuration including the inductor L1, the switch Qsw, the diodes D1 and D2, and the capacitor C1 will be called a boost circuit.

The bridge diode BD rectifies an alternating current (AC) voltage input from the outside to output a full-wave rectified voltage Vin. The full-wave rectified voltage is a full-wave rectified value of the input AC voltage, and therefore the AC voltage and the full-wave rectified voltage Vin have the same magnitude. Therefore, the full-wave rectified voltage Vin will be referred to as an input voltage hereinafter. A first end of the inductor L1 is connected to an output of the bridge diode BD and a second end is connected to an anode of the diode D1. The input voltage is input to the first end of the inductor L1 and an inductor current ID flows to the inductor L1 by the input voltage. The secondary coil NAUX coupled to the inductor L1 forms a transformer with the inductor L1, and the zero point of the current ID flowing to the inductor L1 can be detected by using the secondary coil NAUX through connection of the transformer. In further detail, the switching controller 100 receives the voltage VAUX and compares the voltage VAUX with a predetermined threshold voltage to determine whether the current becomes zero according to the comparison result. A cathode of the diode D1 is connected to a first end of the capacitor C1, and a second end of the capacitor C1 is grounded. An anode of the diode D2 is connected to an output of the bridge diode BD, and a cathode of the diode D2 is connected to a cathode of the diode D1. A first end of the capacitor Cin is connected to the output of the bridge diode BD and a second end thereof is grounded.

The switch Qsw is electrically connected to the inductor L1 to control the inductor current IL1. When the switch Qsw is turned on, the diode D1 is disconnected so that the inductor current IL1 flows through the switch Qsw, and when the switch Qsw is turned off, the diode D1 is connected so that the inductor current IL1 flows through the diode D1. A drain terminal of the switch Qsw is connected to a node of the inductor L1 and the diode D1, a source terminal thereof is connected to a first end of the switch current sensing resistor Rcs, and a gate terminal is connected to an output terminal of the switching controller 100. The first end of the switch current sensing resistor Rcs is connected to the source terminal of the switch Qsw and a second end thereof is grounded. In the exemplary embodiment of the present invention, the switch Qsw is formed as a MOSFET, but the present invention should not be understood to be limited thereto. That is, another switch such as a bipolar transistor may be used. In addition, in FIG. 5, a capacitor Coss and a diode Db connected in parallel with the drain terminal and the source terminal of the switch Qsw respectively represent a junction capacitor and a body diode of the MOSFET.

The switching controller 100 includes a flip-flop 10, an output voltage controller AMP1, comparators CMP1 to CMP3, a restarting timer 30, OR gates 20 and 50, an AND gate 70, a diode short-circuit protection circuit 60, and a ramp generator 40.

The flip-flop 10 outputs a low-level signal at an output terminal Q to the AND gate 70 when a high-level signal is input to a reset terminal R, and outputs a high-level signal at the output terminal Q to the AND gate 70 when a high-level signal is input to a set terminal S.

An output reference voltage Vref is input to a non-inverting (+) terminal of the output voltage controller AMP1, and a sensed output voltage Vsense is input to an inverting (−) terminal thereof. The output voltage controller AMP1 compares the output reference voltage Vref and the sensed output voltage Vsense to output an output control voltage Vctrl for controlling an output voltage Vout of the power factor correction circuit as desired. The voltage VAUX of the secondary coil NAUX is input to an inverting (−) terminal of the comparator CMP1, and a threshold voltage Vth is input to a non-inverting (+) terminal thereof. Here, the threshold voltage Vth is set to the voltage VAUX of the secondary coil NAUX after a predetermined delay from the zero point of the inductor current IL1. The comparator CMP1 compares the voltage VAUX of the secondary coil NAUX with the threshold voltage Vth, and outputs a high-level zero current detection signal ZCD to an input terminal at one end of the OR gate when the voltage VAUX of the secondary coil NAXU is decreased to the threshold voltage Vth.

The output control voltage Vctrl of the output voltage controller AMP1 is input to an inverting (−) terminal of a comparator CMP2, and a ramp waveform voltage Vramp generated from the ramp generator 40 is input to a non-inverting (+) terminal thereof. The comparator CMP2 compares the output control voltage Vctrl and the ramp waveform voltage Vramp to output a high-level signal to an input terminal at one end of an OR gate 50 at the point when the ramp waveform voltage Vramp equals the output control voltage Vctrl. A switch current sensing voltage Vcs is input to a non-inverting (+) terminal of a comparator CMP3, and an overcurrent reference voltage Vocp is input to an inverting (−) terminal thereof. The overcurrent protection comparator CMP3 compares the switch current sensing voltage Vcs and the overcurrent reference voltage Vocp to output a high-level signal as an input signal to a second end of the OR gate 50 at the point when the two voltages are equal to each other.

The restarting timer 30 generates a signal RST to turn on the switch Qsw after the switching controller 100 starts to operate, by power supplied thereto. This is because a signal VG for turning on the switch Qsw is not generated from the secondary coil NAUX of the inductor L1 during the starting stage. Once the switch Qsw is turned on, a signal is generated from the secondary coil NAUX so that the switch Qsw can be turned on by using the signal. In addition, when the protection circuit operates or a switching operation is stopped for a long period of time due to insufficient load while the restarting timer 30 is being operated, the turn-on signal is not generated from the secondary coil NAUX so that the restarting timer 30 generates a signal RST for turning on the switch. The restarting timer 30 has a cycle of several hundreds of us, and turns on the switch Qsw when the switch Qsw is not turned on during a predetermined period of time after being turned off.

The OR gate 20 outputs a high-level signal to the set terminal S of the flip-flop 10 when the comparator COMP1 outputs a high-level signal or the restarting timer 30 outputs a high-level signal. The OR gate 50 outputs a high-level signal to the reset terminal R of the flip-flop 10 when the comparator CMP2 outputs a high-level signal or the comparator CMP3 outputs a high-level signal. The AND gate 70 outputs a high-level gate signal VG when the output terminal Q of the flip-flop 10 outputs a high-level signal and the diode short-circuit protection circuit 60 outputs a high-level output signal SCPO.

The diode short-circuit protection circuit 60 detects whether the diode D1 is short-circuited, and outputs a low-level signal SCPO when the diode D1 is short-circuited and outputs a high-level signal SCPO when the diode D1 is in normal operation. The ramp generator 40 generates a linearly increasing ramp waveform voltage Vramp after the switch Qsw is turned on.

Meanwhile, the power factor correction circuit according to the exemplary embodiment of the present invention further includes resistors R1 and R2 for sensing an output voltage Vout for feeding back the output voltage Vout. The resistors R1 and R2 are coupled in series and connected between a first end of the capacitor C1 and the ground, and a sensed output voltage Vsense at the resistor R2 is input to the switching controller 100.

The boost circuit according to the first exemplary embodiment of the present invention generates the signal SCOP for protecting the switch by using the fact that a current of the switch Qsw excessively increases when the diode D1 or diode D2 is short-circuited. The switching controller 100 receives the sensed output voltage Vsense and a voltage VAUX induced through the secondary coil NAUX of the inductor L1 for controlling turn-on/turn-off of the switch Qsw to generate a control signal for controlling the turn-on/turn-off of the switch Qsw, and the switch Qsw is turned on/off by the control signal of the switching controller 100 to send a constant direct current (DC) voltage to the capacitor C1 of the boost circuit. In addition, information of the switch current is changed to a voltage Vcs through the switch current sensing resistor Rcs and the voltage Vcs is input to the switching controller 100 in order to prevent the switch Qsw from being damaged due to an overcurrent, and the switch Qsw can be protected by using the fact that the voltage Vcs excessively increases when the diode D1 is short-circuited.

In further detail, the switch Qsw is turned on when the current flowing to the inductor L1 is zero, and the comparator CMP2 outputs a high-level signal when an output control voltage, Vctrl of an output voltage controller AMP1 equals the ramp waveform voltage Vramp such that the switch Qsw is turned off.

The overcurrent protection comparator CMP3 operates when the current of the switch Qsw has been increased to the overcurrent protection level if the input voltage of the power factor correction circuit decreases suddenly or a load of the power factor correction circuit increases rapidly.

However, as previously described, the switch cannot be protected only with the overcurrent protection comparator CMP3 when the diode D1 or D2 is short-circuited, and therefore the diode short-circuit protection circuit 60 is used to protect the switch Qsw according to the present invention.

Figure 2:
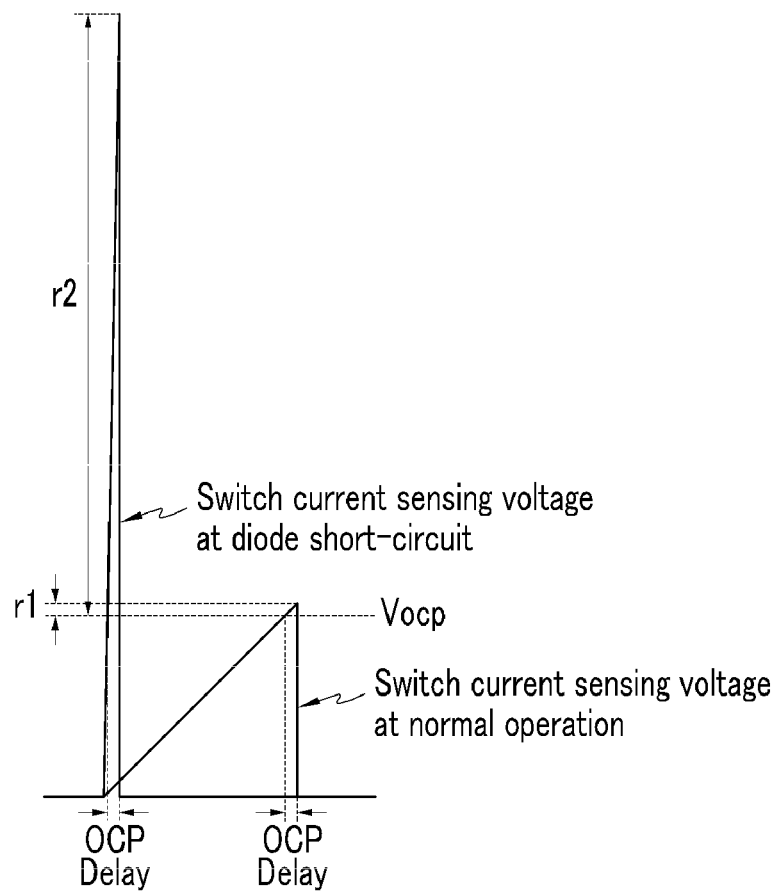
FIG. 2 shows a comparison of a voltage generated by sensing a current flowing to a switch when a diode is short-circuited, and a voltage generated in a normal condition.
Figure 3:
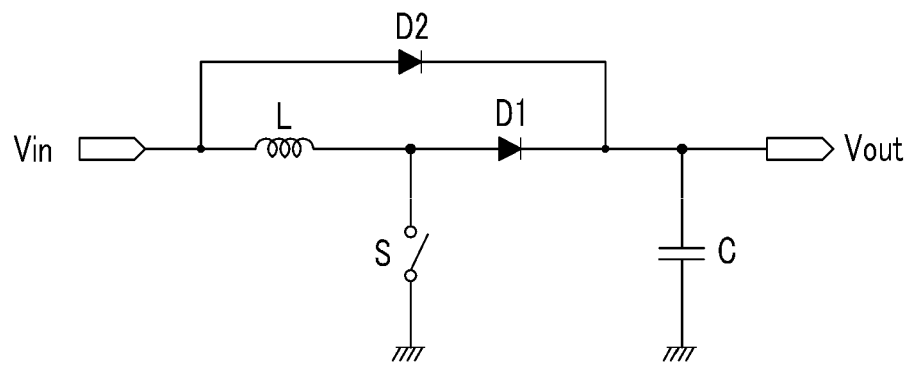
FIG. 3 and FIG. 4 show a power factor correction circuit including a separate diode.
Figure 4:
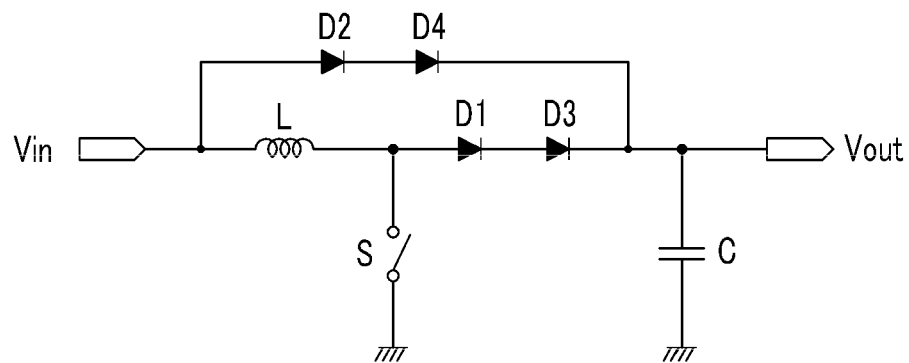

In the first exemplary embodiment of the present invention, the switch current sensing voltage Vcs is received to generated the signal SCPO for preventing the switch Qsw from being turned on for protecting the switch Qsw when the diode is short-circuited, and this will be described in further detail with reference to FIG. 6 and FIG. 7. As shown in FIG. 2, the switch current sensing voltage Vcs is increased to more than two times higher than the overcurrent reference voltage Voc when the diode is short-circuited, and therefore the signal SCPO is generated by using information of the switch current sensing voltage Vcs, and this will be described in further detail.

Figure 6:
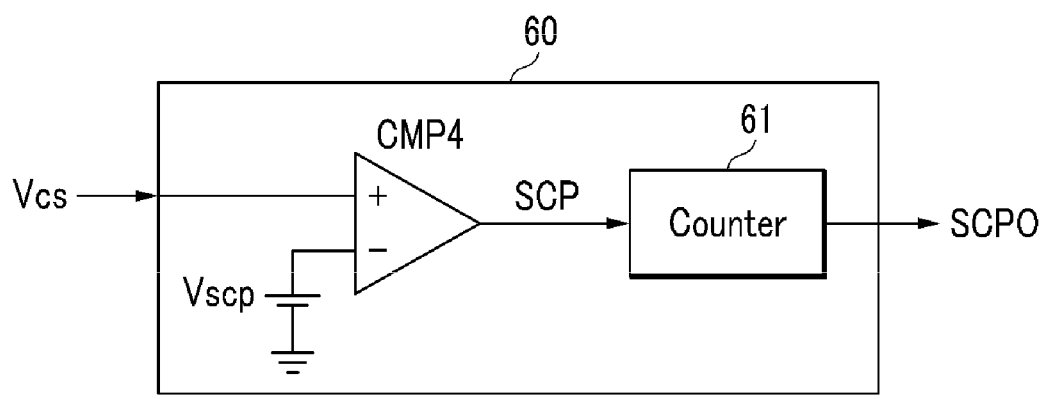
FIG. 6 shows an internal configuration of a diode short-circuit protection circuit 60 of FIG. 5.

FIG. 6 shows an internal configuration of the diode short-circuit protection circuit 60 of FIG. 5.

As shown in FIG. 6, according to the first exemplary embodiment of the present invention, the switch current sensing voltage Vcs is input to the diode short-circuit protection circuit 60. The switch current sensing voltage Vcs is input to a non-inverting (+) terminal of the comparator CMP4 and is compared with the diode short-circuit reference voltage Vscp input to an inverting (−) terminal thereof to generate an output signal SCP of the CMP4, and the output signal SCP is input to the counter 61. The counter 61 counts high-level output signals SCP. The diode short-circuit reference voltage Vscp is set to a voltage that is higher than the overcurrent reference voltage Vocp. In the exemplary embodiment of the present invention, the diode short-circuit reference voltage Vscp is two times to four times the overcurrent reference voltage Vocp. When the diode short-circuit reference voltage Vscp is set too low, the diode short-circuit protection circuit 60 may react to noise of the current sensing voltage Vcs, and when the voltage Vscp is set too high, the current sensing voltage Vcs cannot be increased to the diode short-circuit reference voltage Vscp so that the diode short-circuit protection circuit 60 may not be able to sense a short-circuit of the diode even when the diode is short-circuited.

When the count of the counter 61 exceeds a predetermined value, the output signal SCPO of the counter 61 is changed to low-level from high-level, and the low-level signal is input to the AND gate 70 such that the switch Qsw cannot be turned on. Since the output signal SCP of the comparator CMP4 may be maintained in high-level for a relatively long period of time due to starting, surging, or electrostatic discharge of the power factor correction circuit, the counter 61 is used. Thus, the number of times of counting of the counter 61 may be increased, and accordingly the circuit size of the counter 61 may be increased. A method for solving this problem will be described with reference to a secondary exemplary embodiment of the present invention.

Figure 7:
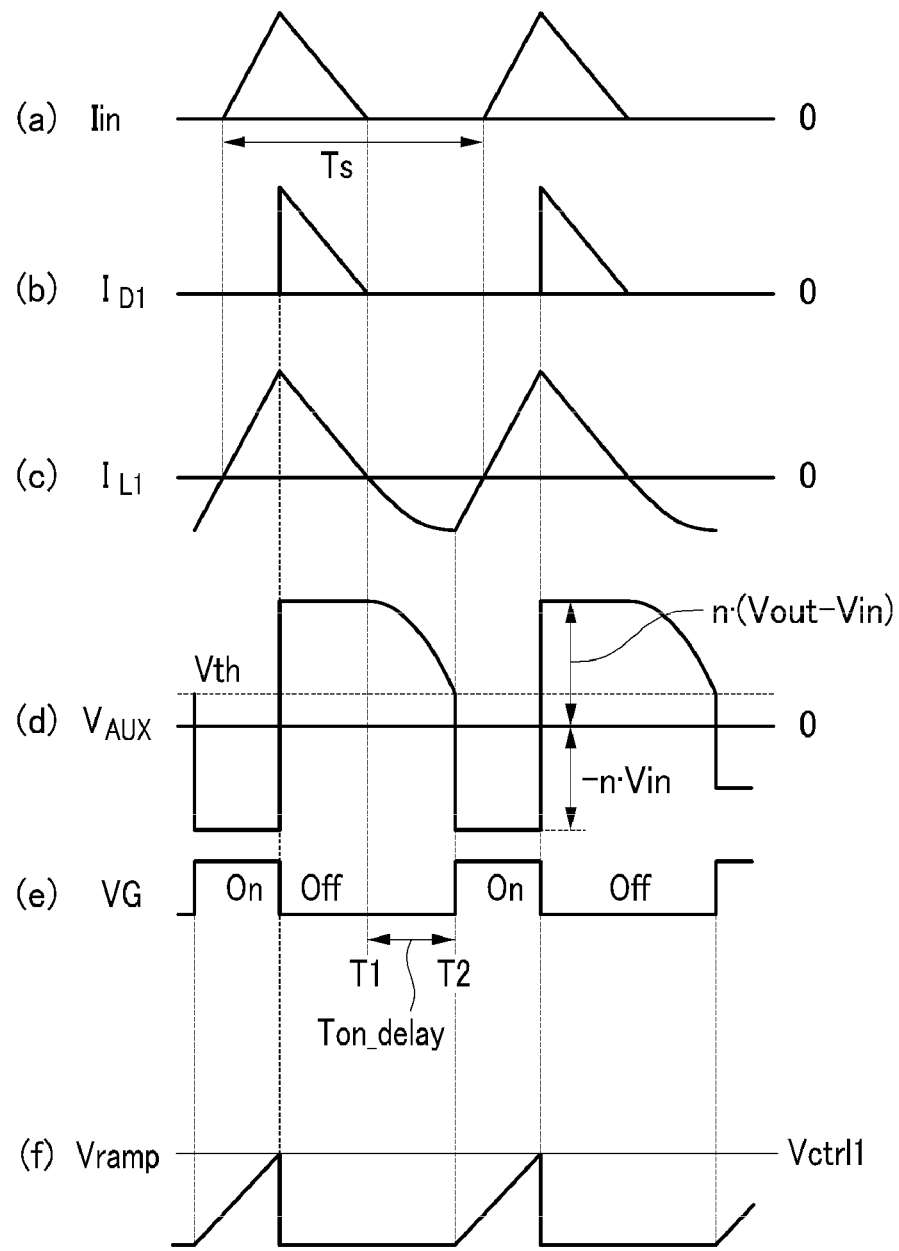
FIG. 7 shows an input current Iin flowing to the power factor correction circuit, a current ID1 flowing through a diode D1, a current IL1 flowing through an inductor L1, a voltage VAUX at a secondary coil NAUX, a gate signal VG input to a switch Qsw, a ramp waveform voltage Vramp, and a control voltage Vctrl.
Figure 8:
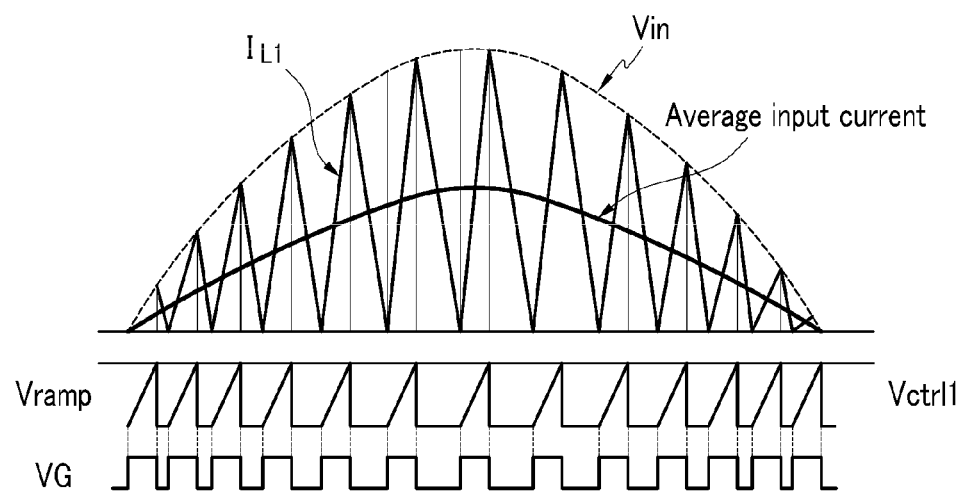
FIG. 8 shows an inductor current IL1, an input voltage Vin, and an average input current according to an exemplary embodiment of the present invention.
Figure 9:
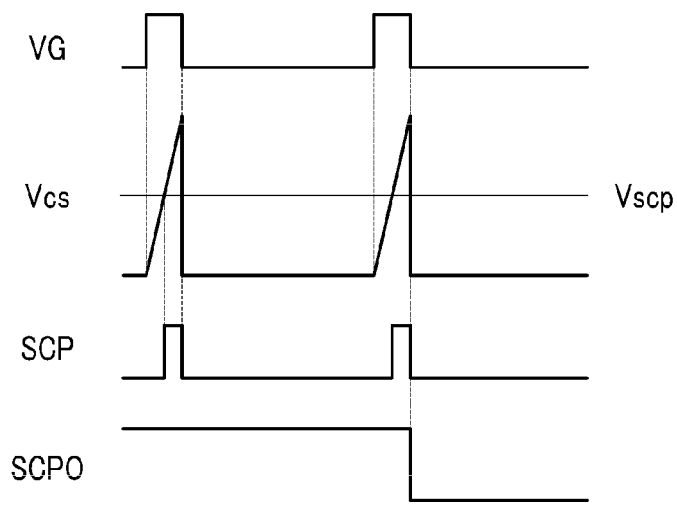
FIG. 9 shows a gate signal, a detected voltage, and an output signal of a diode short-circuit protection circuit upon occurrence of an over-current.

FIG. 7 shows an input current Iin flowing to the power factor correction circuit, a current ID1 flowing through a diode D1, a current IL1 flowing through an inductor L1, a voltage VAUX at a secondary coil NAUX, a gate signal VG input to a switch Qsw, a ramp waveform voltage Vramp, and a control voltage Vctrl. FIG. 8 shows an inductor current IL1, an input voltage Vin, and an average input current according to the second exemplary embodiment of the present invention. FIG. 9 shows a gate signal, a detected voltage, and a diode short-circuit protection circuit upon an occurrence of overcurrent.

Referring to FIG. 7 to FIG. 9, operation of a power factor correction circuit according to the first exemplary embodiment of the present invention will now be described.

Referring to FIG. 7, an input AC voltage is full-wave rectified by a bridge diode BD, and the full-wave rectified voltage is supplied to the inductor L1. An output voltage Vout of a power factor correction circuit is divided by resistors R1 and R2. An output voltage controller AMP1 compares a reference voltage Vref connected to a non-inverting (+) terminal thereof with a divided voltage Vsense, and generates a control voltage Vctrl for controlling the output voltage of the power factor correction circuit according to the comparison result. The comparator CMP compares a ramp waveform voltage Vramp and the control voltage Vctrl of the output voltage controller AMP1, and outputs a signal for turning off a switch Qsw to a reset terminal R of a flip-flop 10 when the ramp waveform voltage Vramp equals the control voltage Vctrl. Accordingly, the flip-flop 10 outputs a low-level gate signal VG through an output terminal Q thereof to turn off the switch Qsw. When the switch Qsw is turned off, a current L1 of an inductor L1 is gradually decreased. The moment that the inductor current, IL1 becomes zero can be sensed by a secondary coil NAUX of the inductor L1. As shown in (d) of FIG. 7, the winding direction of the secondary coil NAUX is opposite to that of the inductor L1 so that a voltage VAUX of the secondary coil NAUX is negatively (−) proportional to an input voltage Vin when the switch Qsw is turned on and is positively (+) proportional to a difference of an output voltage Vout and an input voltage Vin when the switch Qsw is turned off. The switching controller 100 detects a time T1 from which the voltage VAUX of the secondary coil NAUX that is maintained at a constant level, starts to decrease as the moment that the inductor current IL1 becomes zero. In the power factor correction circuit according to the first exemplary embodiment of the present invention, the switch Qsw is turned on after a predetermined delay time Ton_delay from the zero point of the inductor current IL1. A value of the voltage VAUX at a time T2 after the delay time Ton_delay from time T1 is set to a threshold voltage Vth. When the voltage VAUX is decreased to the threshold voltage Vth at the time T2, a comparator CMP1 outputs a high-level zero current detection signal, ZCD to an OR gate 20. As described, when the voltage VAXU of the secondary coil NAUX reaches the threshold voltage, Vth after the switch Qsw is turned off and the inductor current IL1 is zero, the switch Qsw is turned on. In FIG. 7, the delay time Ton_delay is more exaggerated than the actual time, for convenience of description. The delay time Ton_delay is substantially a very short time, and the zero point of the inductor current IL1 and the turn-on time of the switch Qsw are substantially the same. The switch Qsw is turned off at a point that a ramp waveform voltage Vramp of the ramp generator 40 and the control voltage Vctrl of the output voltage controller AMP1 are at the same level.

As shown in FIG. 8, an increase slope of the inductor current IL1 is proportional to an input voltage, and a peak value of the inductor current IL1 follows a waveform of the input voltage Vin. In addition, an average input current corresponds to an average value of the inductor current IL1. Accordingly, the average input current follows the input voltage Vin. In addition, as shown in FIGS. 7 and 8, the inductor current IL1 is controlled in a critical conduction mode.

The gate signal VG that turns on the switch Qsw becomes high level when the voltage VAUX of the secondary coil NAUX is decreased lower than the threshold voltage Vth after the voltage is increased higher than the threshold voltage Vth during the switch Qsw turn-off period. However, when the switching operation is stopped for a long period of time at a starting stage or by a protection circuit, the voltage VAUX of the secondary coil NAUX becomes zero so that the switch Qsw is compulsorily turned on by the restarting timer 30.

Then, an overcurrent may flow to the switch Qsw, thereby causing damage thereto. In order to prevent this, the comparator CMP3 detects the current of the switch Qsw through a resistor Rcs to compare a detected voltage Vcs and an overcurrent reference voltage Vocp.

As shown in FIG. 9, the comparator CMP3 transmits a signal for turning off the switch Qsw to the OR gate 50 when the detected voltage Vcs is greater than the overcurrent reference voltage Vocp. Then, the OR gate 50 outputs a high-level signal so that the flip-flop 10 outputs a low-level signal to an AND gate 70 through an output terminal Q thereof. Thus, the gate signal VS becomes low level and the switch Qsw is turned off.

During this operation, when the diode D1 is short-circuited due to a defect therein, the input voltage Vin is connected to an output capacitor C1 through the inductor L1 such that the input voltage Vin and the output voltage Vout of the power factor correction circuit become equivalent to each other. Accordingly, a lateral voltage of the inductor L1 becomes zero so that the voltage VAUX of the secondary coil NAUX becomes zero at the turn-off of the switch Qsw. Since a signal for turning the switch Qsw again is not input at this time, the switching operation is stopped and the restarting timer 30 generates a turn-on signal RST to turn on the switch Qsw after the period of the restarting timer 30 therefrom. That is, when the diode D1 is short-circuited, the switch Qsw is turned on by the restarting timer 30. When the switch Qsw is turned on, energy charged in the output capacitor C1 is discharged through the switch Qsw. In this case, an excessive amount of current instantly flows because no circuit for controlling the current exists between the switch Qsw and the capacitor C1. Then, a comparator CMP4 detects the current of the switch Qsw through a resistor Rcs and compares the detected switching current sensing voltage Vcs and the diode short-circuit reference voltage Vscp. The comparator CMP4 generates a high-level output signal SCP during a period when the switching current sensing voltage Vcs is greater than the diode short-circuit reference voltage Vscp. Then, a counter 61 counts high-level output signals of the comparator CMP4 and the output of the counter 61 is decreased to low level from high level when the number of counts exceeds a predetermined value. In the first exemplary embodiment of the present invention, when the comparator CMP4 outputs a high-level signal more than twice, the output of the counter 61 is decreased to low level from high level. However, the present invention is not limited thereto. That is, the predetermined value may be changed according to design. When the output of the counter 61 is changed to low level, the AND gate 70 outputs a low-level signal so that the switch Qsw is turned off. Accordingly, damage to the switch Qsw can be prevented.

Figure 10:
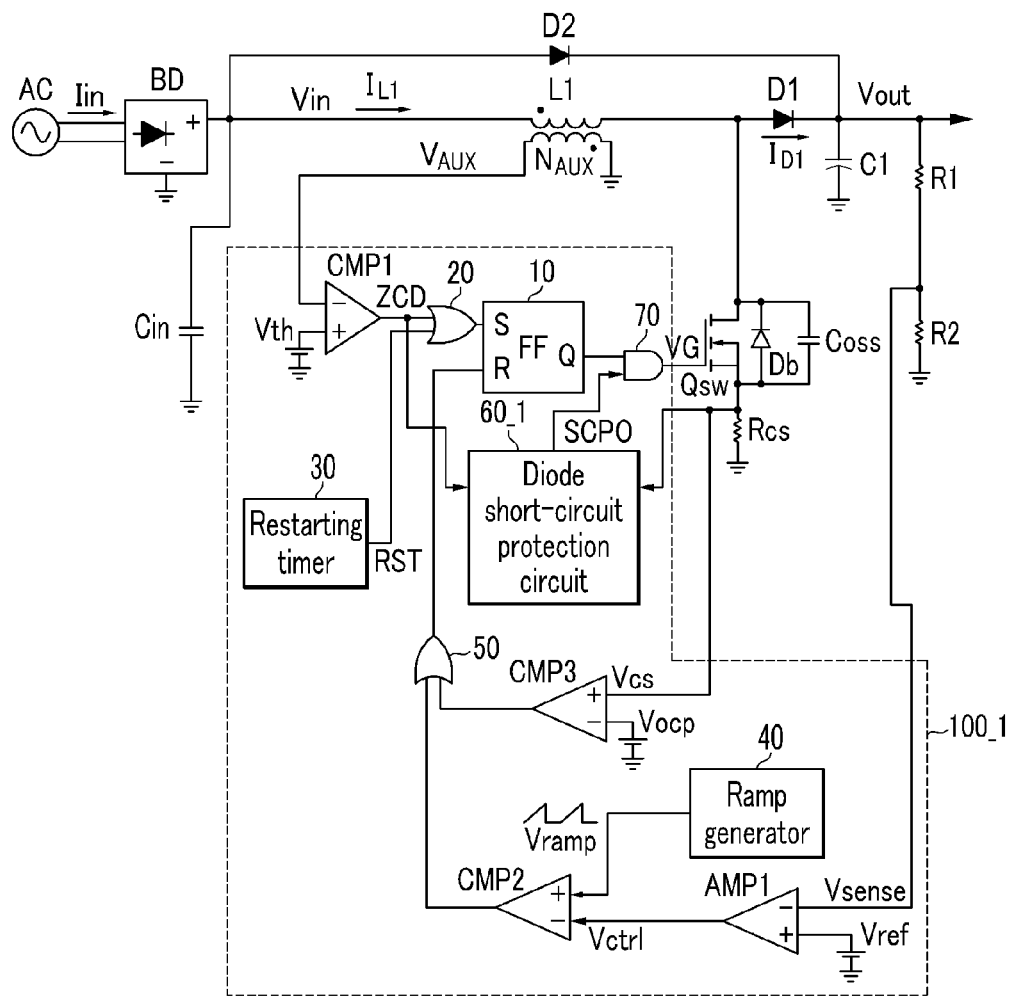
FIG. 10 shows a power factor correction circuit according to a second exemplary embodiment of the present invention.
Figure 11:
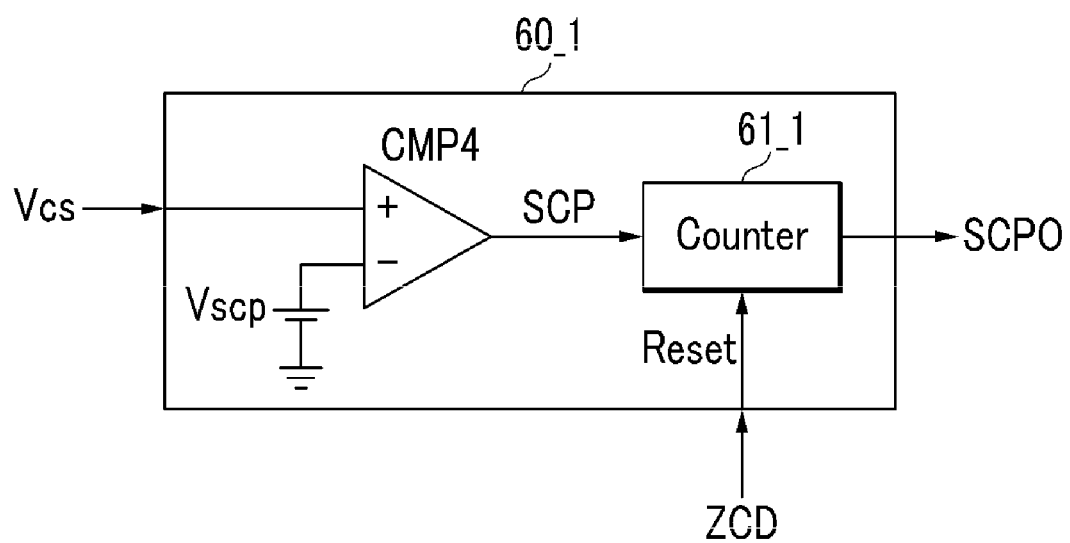
FIG. 11 shows an internal configuration of a diode short-circuit protection circuit 60_1 of FIG. 10.

FIG. 10 shows a power factor correction circuit according to a second exemplary embodiment of the present invention, and parts that are the same as those in FIG. 5 have the same reference numerals and will not be described. FIG. 11 shows an internal configuration of a diode short-circuit protection circuit 60_1 of FIG. 10.

Referring to FIG. 10, the power factor correction circuit according to the second exemplary embodiment of the present invention receives a switch current sensing voltage Vcs and an output signal ZCD of a zero current detection comparator CMP1 at the diode short-circuit protection circuit 60_1. In the first exemplary embodiment of the present invention, the diode short-circuit protection circuit 60 receives only the switch current sensing voltage Vcs so that the size of the counter 61 may be increased. Thus, in the second exemplary embodiment of the present invention, the diode short-circuit protection circuit receives the output signal ZCD of the zero current detection comparator CMP1 and resets the counter 61_1 when the output signal ZCD is changed to high level from low level. Here, the counter is reset for the following reason. When a diode D1 is short-circuited, an input voltage Vin and an output voltage Vout of the power factor correction circuit become equivalent to each other and a lateral voltage of an inductor L1 becomes almost zero. Therefore, a voltage VAUX of a secondary coil NAUX of the inductor L1 also becomes zero so that the output signal ZCD of the comparator CMP1 is not increased to high level from low level. The comparator CMP1 according to the second exemplary embodiment of the present invention outputs a high-level output signal ZDC only at a falling edge (that is, T2 of FIG. 7) where the voltage VAUX of the secondary coil NAUX of the inductor L1 is increased higher than a threshold voltage Vth and then decreased lower than the threshold voltage Vth. That is, referring to FIG. 11, it is determined that the diode D1 is short-circuited when a high-level output signal SCP of the comparator CMP4 is input to the counter 61_1 while the output signal ZCD of the comparator CMP1 is in the low-level state. On the other hand, when the output signal ZCD is changed from low level to high level even though the high-level output signal SCP of the comparator CMP4 is input to the counter 61_1, it is determined that the output signal SCP of the comparator CMP4 malfunctions at the power factor correction circuit starting stage or due to a surge or ESD rather than the diode D1 being short-circuited. As described, when the counter 61_1 is reset by using the output signal ZCD of the comparator CMP1, the output signal SCP from the malfunction is not counted so that the size of the counter 61_1 can be reduced.

Figure 12:
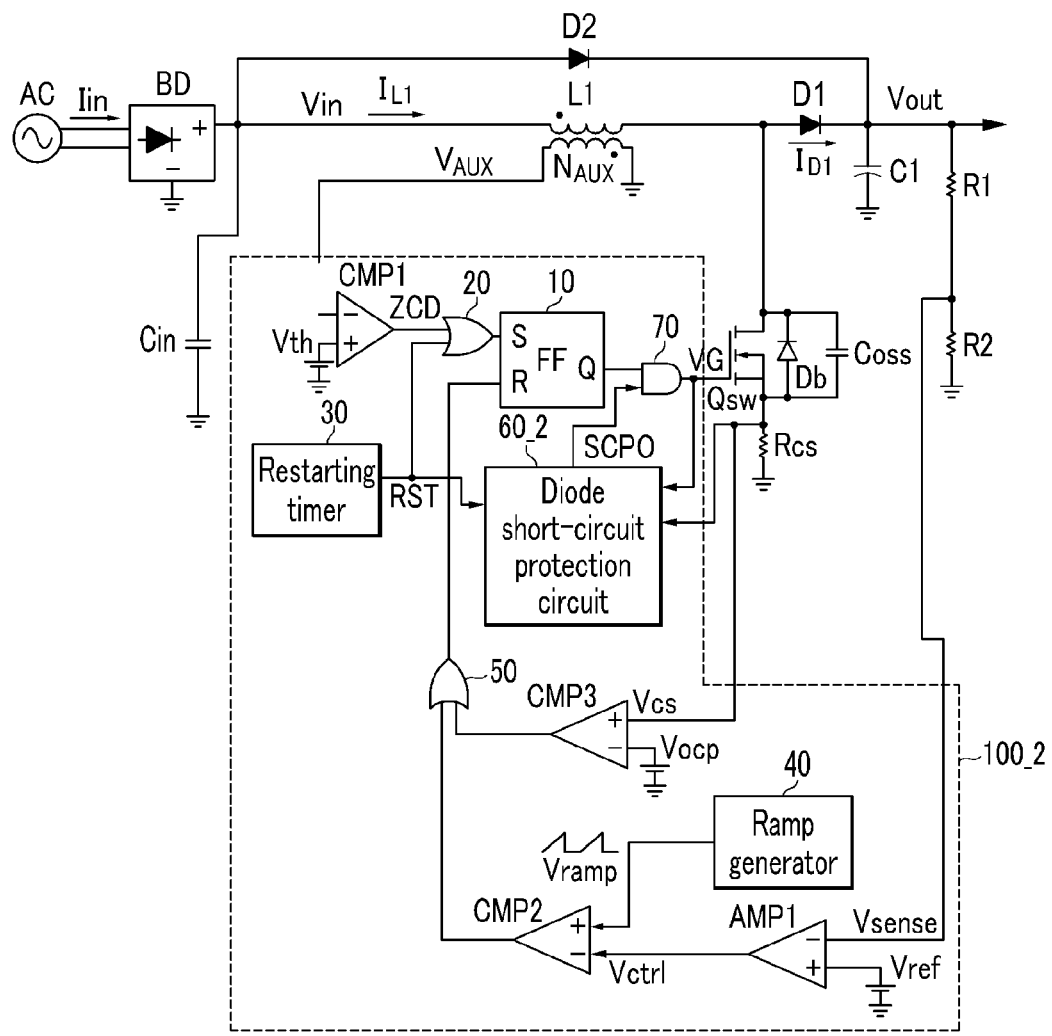
FIG. 12 shows a power factor correction circuit according to a third exemplary embodiment of the present invention.
Figure 13:
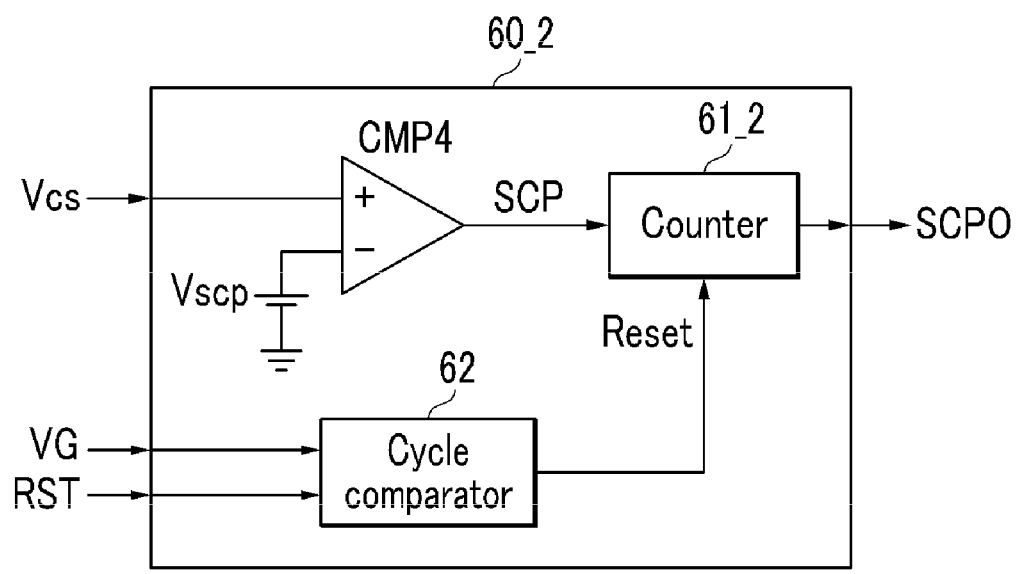
FIG. 13 shows an internal configuration of a diode short-circuit protection circuit 60_2 of FIG. 12.

FIG. 12 shows a power factor correction circuit according to a third exemplary embodiment of the present invention, and parts that are the same as those in FIG. 5 have the same reference numerals and will not be described. FIG. 13 shows an internal configuration of a diode short-circuit protection circuit 60_2 of FIG. 12.

Referring to FIG. 12, a power factor correction circuit according to the third exemplary embodiment of the present invention receives a switch current sensing voltage Vcs, a gate signal VG, and an output signal RST of a restarting timer 30 at a diode short-circuit protection circuit 60_2. The diode short-circuit protection circuit 60_2 according to the third exemplary embodiment of the present invention compares the period of the gate signal VG and the period of the output signal RST of the restarting timer 30, and determines that a diode is not short-circuited if the period of the gate signal VG is shorter than that of the output signal RST of the restarting timer 30. That is, referring to FIG. 13, a period comparator 62 compares the period of the gate signal VG and the period of the output signal RST of the restarting timer 30. The period comparator 62 outputs a reset signal from low level to high level to reset a counter 61_2 when the period of the gate signal VG is shorter than that of the output signal RST of the restarting timer 30. When the diode is not short-circuited (that is, in a normal condition), the output voltage Vout is higher than the input voltage Vin and a voltage of the secondary coil is normally generated so that the output signal ZCD of the comparator CMP1 is normally generated. A switching operation frequency in the normal condition is higher than the case that the switching operation is performed by the restarting timer 30. Therefore, a normal condition may be determined if the period of the gate signal is shorter than that of the restarting timer. With such a configuration, the size of the counter 61_2 can be reduced.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A power factor correction circuit comprising:
   an inductor including a first end to which an input voltage is input;
   a switch electrically connected to a second end of the inductor; and
   a diode transmitting a current flowing to the inductor to an output end,
   wherein an occurrence of a current flowing to the switch that is higher than a predetermined threshold value for detecting a short of the diode is counted and the switch is turned off when the count is greater than a predetermined reference value.

2. The power factor correction circuit of claim 1, comprising a diode short-circuit protection circuit that receives a detected voltage corresponding to the current flowing to the switch, compares a predetermined reference voltage corresponding to the predetermined threshold value with the detected voltage, counts an occurrence of the detected voltage being greater than the reference voltage, and turns off the switch when the count reaches the predetermined reference value.

3. The power factor correction circuit of claim 2, wherein the diode short-circuit protection circuit comprises:
   a comparator including a non-inverting terminal to which the detected voltage is input and an inverting terminal to which the reference voltage is input; and
   a counter counting an increase of an output signal of the comparator and outputting a protection signal for turning off the switch when the count is greater than the reference value.

4. The power factor correction circuit of claim 3, further comprising a secondary coil coupled to the inductor and to which a voltage corresponding to a lateral voltage of the inductor is induced.

5. The power factor correction circuit of claim 4, wherein the counter resets the number of counts at a time that the voltage of the secondary coil is decreased lower than a predetermined threshold voltage.

6. The power factor correction circuit of claim 4, wherein the switch is turned on by a gate signal activated for a period during which the voltage of the secondary coil is decreased to lower than the threshold voltage.

7. The power factor correction circuit of claim 6, further comprising a restarting timer generating a signal for turning on the switch with a predetermined cycle when no voltage is generated at the secondary coil.

8. The power factor correction circuit of claim 7, wherein the diode short-circuit protection circuit further comprises a period comparator that compares a period of the gate signal with a period of an output signal of the restarting timer and resets the counter when the period of the gate signal is shorter than that of the output signal of the restarting timer.

9. A driving method of a power factor correction circuit comprising an inductor of which a first end is electrically connected to an input end of the power factor correction circuit, a secondary coil coupled to the inductor, a switch electrically connected to the inductor to control a current flowing thereto, and a diode transmitting the current flowing to the inductor to an output terminal of the power factor correction circuit, comprising:
   counting an occurrence of the current flowing to the switch that is greater than a predetermined threshold value for detecting a short of the diode; and
   turning off the switch when the count is greater than a predetermined value.

10. The driving method of claim 9, further comprising resetting the count at a time that the voltage of the secondary coil is decreased to lower than a predetermined threshold voltage.

11. The driving method of claim 9, further comprising turning on the switch with a predetermined period when no voltage is generated at the secondary coil.

12. The driving method of claim 11, further comprising resetting the count when a turn-on period of the switch is shorter than the predetermined cycle.

13. A power factor correction circuit comprising:
   an inductor having a first end to which an input voltage is received;
   a switch that is electronically connected to a second end of the inductor;
   a diode that transmits a current flowing to the inductor to an output terminal of the power factor correction circuit; and
   a diode short-circuit protection circuit configured to receive a switch current sensing voltage $V_{CS}$ from the switch, compare the switch current sensing voltage $V_{CS}$ to a diode short-circuit reference voltage $V_{SCP}$, and provide an output signal SCP to a counter that counts selected high-level output signals SCP, wherein when the counter exceeds a predetermined value, the counter generates an output signal that prevents the switch from turning on.

14. The power factor correction circuit of claim 13, further comprising:

a secondary coil coupled to the inductor and to which a voltage corresponding to a lateral voltage of the inductor is induced, wherein the switch is turned on by a gate signal activated for a period during which the voltage of the secondary coil is lower than a predetermined threshold voltage;

wherein the diode short-circuit protection circuit further comprises (a) a restarting timer that generates an output signal for turning on the switch with a predetermined cycle when no voltage is generated at the secondary coil, and (b) a period comparator configured to (i) compare a period of the gate signal with a period of the output signal of the restarting timer and (ii) reset the counter when the period of the gate signal is shorter than that of the output signal of the restarting timer.

* * * * *